(12) United States Patent
Yasuda

(10) Patent No.: US 12,225,163 B2
(45) Date of Patent: Feb. 11, 2025

(54) IMAGE FORMING APPARATUS INCLUDING METAL STRUCTURE FOR ARRANGING A CONTROL BOARD AND A WIRELESS COMMUNICATION BOARD

(71) Applicant: CANON KABUSHIKI KAISHA, Tokyo (JP)

(72) Inventor: Shinya Yasuda, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/333,668

(22) Filed: Jun. 13, 2023

(65) Prior Publication Data
US 2024/0007569 A1 Jan. 4, 2024

(30) Foreign Application Priority Data
Jul. 4, 2022 (JP) ................. 2022-107812

(51) Int. Cl.
*H04N 1/00* (2006.01)
(52) U.S. Cl.
CPC ..... *H04N 1/00095* (2013.01); *H04N 1/00559* (2013.01); *H04N 1/00978* (2013.01)
(58) Field of Classification Search
CPC . H04N 1/00559; H04N 1/00519; H04N 1/557
See application file for complete search history.

(56) References Cited

U.S. PATENT DOCUMENTS

| 11,843,740 B2 * | 12/2023 | Hamasaki | ............... H01Q 1/24 |
| 2020/0310329 A1 * | 10/2020 | Shuhama | ............... G03G 15/80 |
| 2021/0136243 A1 * | 5/2021 | Wada | ................. H04N 1/00204 |
| 2022/0321720 A1 * | 10/2022 | Mori | ................. H04N 1/00538 |

FOREIGN PATENT DOCUMENTS

JP 6842671 B2 3/2021

* cited by examiner

*Primary Examiner* — Benjamin O Dulaney
(74) *Attorney, Agent, or Firm* — ROSSI, KIMMS & McDOWELL LLP

(57) ABSTRACT

An image forming apparatus includes: a wireless communication board on which a communication circuit is mounted, the communication circuit communicating image data with an external device in a wireless manner; an image forming unit that forms an image based on the image data; a control board connected to the wireless communication board via a connection line to control an image forming operation of the image forming unit; and an accommodation portion of a metal material in which the control board is accommodated, wherein a predetermined metal plate constituting the accommodation portion has a recessed portion, and the wireless communication board is positioned in the recessed portion.

7 Claims, 10 Drawing Sheets

FIG 2
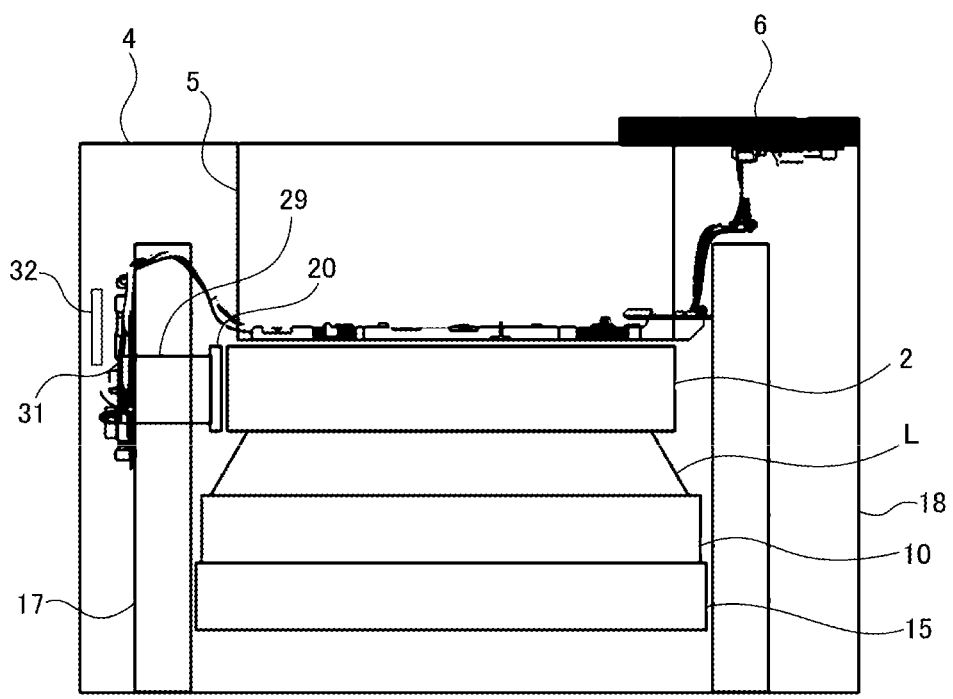
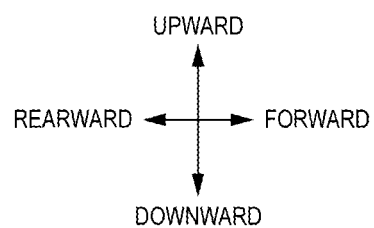

IMAGE FORMING APPARATUS INCLUDING METAL STRUCTURE FOR ARRANGING A CONTROL BOARD AND A WIRELESS COMMUNICATION BOARD

BACKGROUND OF THE INVENTION

Field of the Invention

The present invention relates to an image forming apparatus including a wireless communication board that communicates image data with an external device in a wireless manner.

Description of the Related Art

Conventionally, there has been an image forming apparatus in which a wireless communication board that communicates image data with an external device in a wireless manner is arranged, and the image data obtained from the external device is transmitted to a control board that controls an image forming unit via the wireless communication board to form an image on a recording material.

Japanese Patent No. 6842671 discloses that a wireless communication board is disposed in a space between a control board that controls an image forming unit and an electromagnetic shield plate that covers the control board. Furthermore, it is disclosed that a communication opening for performing communication with an external device is provided in a region of the electromagnetic shield plate facing the wireless communication board.

However, in the above-described conventional art, since the wireless communication board communicates with the external device through the communication opening provided in the electromagnetic shield plate, the communication function is limited to the size of the communication opening. If the wireless communication board is disposed outside the electromagnetic shield plate in order to improve the communication function, the wireless communication board protrudes outward from the electromagnetic shield plate, which increases the size in the thickness direction of the board, resulting in a problem that the image forming apparatus increases in size.

SUMMARY OF THE INVENTION

In a representative configuration of the present invention, an image forming apparatus includes:
- a wireless communication board on which a communication circuit is mounted, the communication circuit communicating image data with an external device in a wireless manner;
- an image forming unit that forms an image based on the image data;
- a control board connected to the wireless communication board via a connection line to control an image forming operation of the image forming unit; and
- an accommodation portion of a metal material in which the control board is accommodated, wherein a predetermined metal plate constituting the accommodation portion has a recessed portion, and the wireless communication board is positioned in the recessed portion.

Further features of the present invention will become apparent from the following description of exemplary embodiments with reference to the attached drawings.

BRIEF DESCRIPTION OF THE DRAWINGS

FIG. 2 is a side cross-sectional view illustrating a schematic configuration of the image forming apparatus.

DESCRIPTION OF THE EMBODIMENTS

Hereinafter, embodiments of the present invention will be exemplarily described in detail with reference to the drawings. However, dimensions, materials, shapes, relative arrangements, and the like of components described in the following embodiments should be appropriately changed depending on the configuration of the device to which the present invention is applied and various conditions, and the scope of the present invention is not limited only thereto.

First Embodiment

Figure 1:
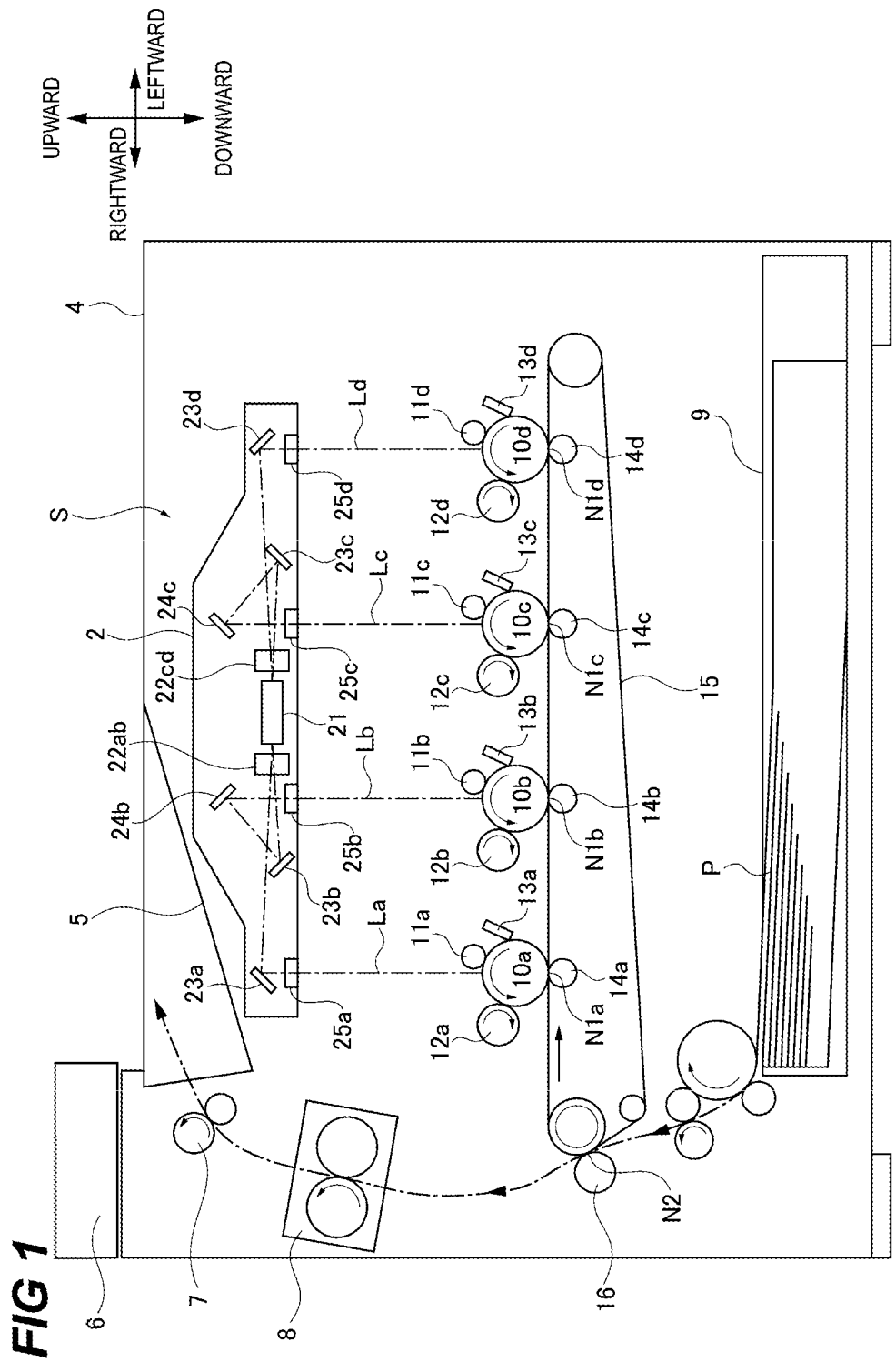
FIG. 1 is a schematic cross-sectional view illustrating a schematic configuration of an image forming apparatus.
Figure 3:
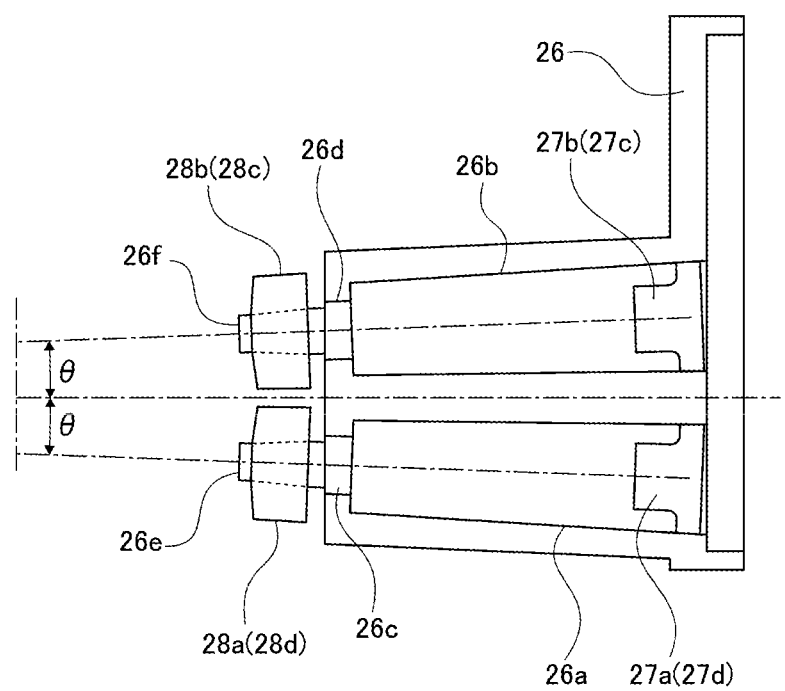
FIG. 3 is a cross-sectional view of a light source portion of an optical scanning device.

An overall configuration of an image forming apparatus will be described with reference to FIGS. 1 to 10. FIG. 1 is a schematic cross-sectional view illustrating a schematic configuration of an image forming apparatus, FIG. 2 is a side cross-sectional view illustrating a schematic configuration of the image forming apparatus, and FIG. 3 is a cross-sectional view of a light source portion of an optical scanning device.

First, an image forming apparatus will be described with reference to FIGS. 1 to 3. Next, an arrangement configuration of a control board and a wireless communication board in the image forming apparatus will be described with reference to FIGS. 4 to 10.

The image forming apparatus S illustrated in FIG. 1 includes an image forming unit that forms an image on a sheet-like recording material P such as a sheet or an overhead projector (OHP).

As the image forming apparatus S, an intermediate tandem type image forming apparatus, which forms images by transferring toner images of four colors of yellow (Y), magenta (M), cyan (C), and black (K) to a recording material after being transferred to an intermediate transfer belt, is exemplified. Note that, in the following description, a, b, c, and d are added as suffixes to members using the toners of the respective colors of yellow (Y), magenta (M), cyan (C), and black (K) in this order, but the configurations and operations of the members are substantially the same except that the colors of the toners to be used are different, and thus the suffixes are appropriately omitted unless they are required to be distinguished from each other.

Hereinafter, a configuration of the image forming unit will be described. The image forming unit includes a drum-type electrophotographic photosensitive member (hereinafter referred to as "photosensitive drum") 10 (10a to 10d) for each color. The photosensitive drum 10 is rotatably supported by the image forming apparatus S, and is driven by a driving portion (not illustrated) to rotate in an arrow direction indicated in the drawings. The photosensitive drum 10 may be a photosensitive belt.

The following processing portions are arranged around the photosensitive drum 10 along the rotation direction thereof. A charging roller 11 (11a to 11d) as a charging portion charges a surface of the photosensitive drum 10. An exposure unit 2 as an exposing portion irradiates the photosensitive drum 10 with a laser beam L (La to Ld) based on image information (a video signal generated from image data) to perform exposure. As a result, an electrostatic latent image is formed on the surface of the photosensitive drum 10. A developing roller 12 (12a to 12d) as a developing portion develops the electrostatic latent image formed on the surface of the photosensitive drum 10 with a toner. The developing rollers 12a to 12d attach toners of different colors (yellow, magenta, cyan, and black) onto the photosensitive drums 10a to 10d, respectively. A cleaning blade 13 (13a to 13d) as a cleaning portion removes the toner remaining on the surface of the photosensitive drum 10 after a toner image is transferred from the photosensitive drum 10 to the intermediate transfer belt 15.

The image forming unit includes an intermediate transfer belt (intermediate transfer member) 15 to which toner images formed on the photosensitive drum 10 is transferred, and a primary transfer roller 14 (14a to 14d) as a transfer portion that sequentially transfers the toner images formed on the photosensitive drum 10 to the intermediate transfer belt 15.

The photosensitive drum 10 is formed by providing a photoconductive layer such as an organic optical semiconductor (OPC) on an outer circumferential surface of an aluminum cylinder. The charging roller 11 includes a core metal and a conductive elastic member surrounding the periphery of the core meta. The charging roller 11 is disposed in contact with the surface of the photosensitive drum 10 to be driven to rotate, and a charging bias is applied thereto by a power supply (not illustrated).

In the exposure unit 2, a laser holding portion 26 illustrated in FIG. 3 holds semiconductor lasers (single beam lasers) 27a and 27b as light sources in a press-fitted state in lens barrel holding portions 26a and 26b. The lens barrel holding portions 26a and 26b are provided with their optical axes inclined so that the optical paths of the semiconductor lasers 27a and 27b intersect each other at a predetermined angle θ in a sub-scanning direction near a rotary polygon mirror 21, and a part of the outer shape of the lens barrel is integrated. Therefore, it is possible to hold the semiconductor lasers 27a and 27b close to each other. Diaphragm portion 26c and 26d corresponding to the semiconductor lasers 27a and 27b are provided at distal ends of the lens barrel holding portions 26a and 26b, respectively, to form light fluxes emitted from the semiconductor lasers 27a and 27b into desired optimal beam shapes. Adhesion portions 26e and 26f of collimator lenses 28a and 28b that convert the light fluxes having passed through the diaphragm portions 26c and 26d into substantially parallel light fluxes are provided at two locations in a main scanning direction at further distal ends of the lens barrel holding portions 26a and 26b. Here, the collimator lenses 28a and 28b adjust irradiation positions and focuses while detecting optical characteristics of laser beams, and when the positions are determined, an ultraviolet curable adhesive is irradiated with ultraviolet light to be bonded and fixed to the adhesion portions 26e and 26f.

Here, the semiconductor lasers 27a and 27b are light sources that emit laser beams La and Lb for exposing the photosensitive drums 10a and 10b illustrated in FIG. 1. Although not illustrated, a semiconductor laser 27c that is a light source that emits a laser beam Lc for exposing the photosensitive drum 10c is disposed at the position of semiconductor laser 27b. Although not illustrated, a semiconductor laser 27d that is a light source that emits a laser beam Ld for exposing the photosensitive drum 10d is disposed at the position of the semiconductor laser 27a. The semiconductor laser 27 (27a to 27d) is electrically connected to a laser board 20 illustrated in FIG. 2, and a laser drive circuit is provided on the laser board 20. The laser board 20 is electrically connected to the control board 31 via a flexible cable 29 to receive a video signal that is image information for causing the semiconductor laser 27 to emit light. After passing through the collimator lens 28 (28a to 28d) (28c and 28d are not illustrated) to become a substantially parallel light flux, the laser beam emitted from the semiconductor laser 27 (27a to 27d) forms a substantially linear image (a linear image that is long in the main scanning direction) on a deflection surface of the rotary polygon mirror 21 using a cylindrical lens (not illustrated) having predetermined refractive power only in the sub-scanning direction.

As illustrated in FIG. 1, the exposure unit 2 accommodates a rotary polygon mirror 21 that deflects and scans a laser beam emitted from the semiconductor laser 27 as a laser beam source, a first imaging optical element 22 (22ab and 22cd) that guides the laser beam polarized and scanned by the rotary polygon mirror 21 to a corresponding one of the photosensitive drums 10a to 10d to form an image, reflection mirrors 23 (23a, 23b, 23c and 23d) and 24 (24b and 24c), and a second imaging optical element 25 (25a, 25b, 25c, and 25d). The exposure unit 2 irradiates the charged surfaces of the photosensitive drums 10a to 10d with laser beams La to Ld based on the image information to form electrostatic latent images. The developing roller 12 causes toner to adhere to the electrostatic latent image on the surface of the photosensitive drum 10 to develop the electrostatic latent image, thereby forming a toner image on the surface of the photosensitive drum 10.

The intermediate transfer belt 15 is a belt formed in an endless shape so as to form a ring, and is stretched over three tension rollers parallel to each other. When the three tension rollers rotate, the intermediate transfer belt 15 is driven in such a manner that its surface moves in an arrow direction. The primary transfer roller 14 (14a to 14d) is disposed inside the ring of the intermediate transfer belt 15, presses the intermediate transfer belt 15 against the surface of the photosensitive drum 10 to form a primary transfer nip portion N1 (N1a to N1d) between the photosensitive drum 10 and the intermediate transfer belt 15. A primary transfer bias is applied to the primary transfer roller 14 by a power supply (not illustrated). A secondary transfer roller 16 is disposed downstream of the primary transfer nip portion N1 (N1a to N1d) in the driving direction of the intermediate transfer belt 15, and a secondary transfer nip portion N2 is formed between the secondary transfer roller 16 and the intermediate transfer belt 15. A secondary transfer bias is applied to the secondary transfer roller 16 by a power supply (not illustrated).

A sheet feeding unit 9 feeds the recording material P to the secondary transfer nip portion N2, and can store a plurality of sheets of recording material P.

A fixing device 8 that heats and pressurizes the recording material P to fix toners on the recording material P is provided downstream of the secondary transfer nip portion N2 in a conveyance direction of the recording material P (a direction indicated by a broken line arrow). A discharge roller 7 for ejecting the recording material P to the outside of the image forming apparatus S is provided further downstream than the fixing device 8 in the conveyance direction.

The above-described configuration is a part that functions as an image forming unit that forms an image on the recording material P. As illustrated in FIG. 2, the image forming unit is supported by a frame including a plurality of sheet metals. Specifically, the image forming unit is disposed between a rear plate 17 and a front plate 18 constituting the frame, and is covered with a cover 4 as an exterior member and an ejected-sheet tray 5, which is an ejected-sheet stacking portion provided on an upper surface portion of the cover 4.

The front plate 18 is formed of a sheet metal, and is provided on the forward side of the image forming apparatus S. The front plate 18 forms a partial portion of the frame (housing) on the forward side of the image forming apparatus S. The rear plate 17 is formed of a sheet metal, and is provided on the rear side of the image forming apparatus S. The rear plate 17 forms a partial portion of the frame (housing) on the backward side of the image forming apparatus S. As illustrated in FIG. 2, the front plate 18 and the rear plate 17 are arranged to face each other, and a sheet metal (not illustrated) is bridged as a beam therebetween. Each of the front plate 18, the rear plate 17, and the beam (not illustrated) constitutes a partial portion of the frame (housing) of the image forming apparatus S.

Figure 4:
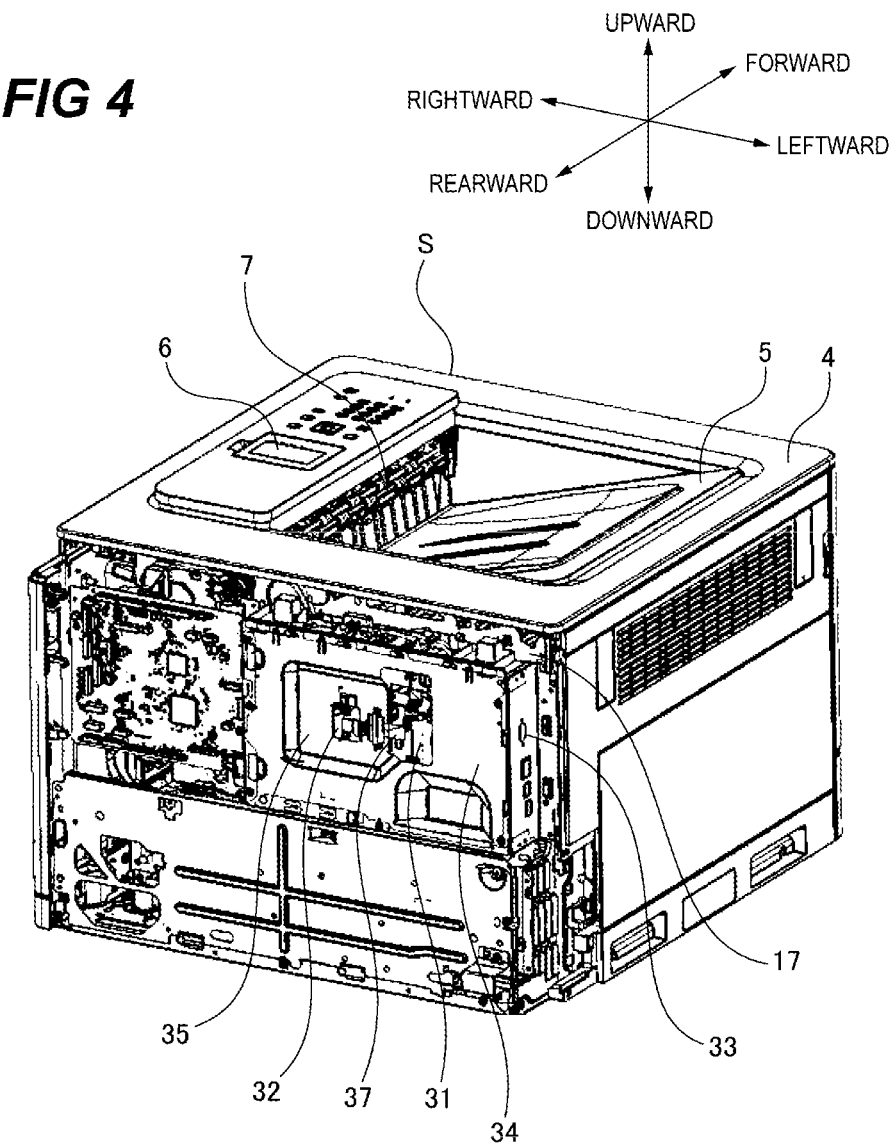
FIG. 4 is a perspective view illustrating a back side of the image forming apparatus.

Here, as illustrated in FIG. 2, in the following description, the front plate 18 side is defined as a front side (forward side or front face side), and the rear plate 17 side is defined as a rear side (inward side or back face side) in the image forming apparatus. When the photosensitive drum 10*d* on which an electrostatic latent image related to a black toner image is formed is used as a reference, the side on which the photosensitive drum 10*a* on which an electrostatic latent image related to a yellow toner image is formed is disposed is defined as a right side. When the photosensitive drum 10*a* on which an electrostatic latent image related to a yellow toner image is formed is used as a reference, the side on which the photosensitive drum 10*d* on which an electrostatic latent image related to a black toner image is formed is disposed is defined as a left side. Furthermore, the upward side in the vertical direction, which is a direction perpendicular to the front-rear direction and the left-right direction defined here, is defined as an upward direction, and the downward side in the vertical direction, which is a direction perpendicular to the front-rear direction and the left-right direction defined here, is defined as a downward direction. The defined forward, rearward, rightward, leftward, upward, and downward are shown in FIGS. 2, 4, etc.

The control board 31 is attached onto the rear plate 17, and a control signal is transmitted to each unit via a bundle line (connection line). The control board 31 receives image data for forming an image on the recording material P from an external device (not illustrated) via the wireless communication board 32 that wirelessly communicates the image data, and controls an image forming operation of the image forming unit based on the received image data. In this configuration, any wireless communication scheme can be used, such as Wi-fi, BLE, or NFC, for the operation.

Next, the image forming operation of the image forming apparatus S will be described. While the photosensitive drum 10 is driven to rotate in the arrow direction of FIG. 1, a toner image is formed on the surface thereof through the following processes.

First, the surface of the photosensitive drum 10 is charged by the charging roller 11 to which a charging bias is applied, such that the photosensitive drum 10 has a predetermined potential. Thereafter, a laser beam L is irradiated by the exposure unit 2 according to a video signal which is image information from the control board 31, such that an electrostatic latent image is formed on the surface of the photosensitive drum 10. A toner adheres to the electrostatic latent image formed on the surface of the photosensitive drum 10, which is a portion irradiated with the laser beam, at a position facing (abutting on) the developing roller 12, such that a toner image obtained by developing the electrostatic latent image appears. By performing such an operation on each of the photosensitive drums 10, toner images of different colors (yellow, magenta, cyan, and black) are formed on the respective photosensitive drums 10.

Then, a primary transfer bias applied to the primary transfer roller 14 causes the toner image on the photosensitive drum 10 to be transferred onto the intermediate transfer belt 15 at the primary transfer nip portion N1. In addition, the toner images on the respective photosensitive drums 10 are formed at timings at which the toner images overlap each other when transferred onto the intermediate transfer belt 15. Therefore, a four-color toner image in which yellow, magenta, cyan, and black toner images overlap each other is formed on the intermediate transfer belt 15. The toner remaining on the photosensitive drum 10 after passing through the primary transfer nip portion N1 is scraped off by the cleaning blade 13.

The toner image on the intermediate transfer belt 15 is conveyed to the secondary transfer nip portion N2 by the rotation of the intermediate transfer belt 15. In addition, the recording material P is conveyed to the secondary transfer nip portion N2 according to a timing at which the toner image on the intermediate transfer belt 15 is conveyed to the secondary transfer nip portion N2. A secondary transfer bias applied to the secondary transfer roller 16 causes the toner image on the intermediate transfer belt 15 to be transferred onto the recording material P at the secondary transfer nip portion N2.

The recording material P to which the toner image has been transferred is conveyed to the fixing device 8, and the toner image heated and pressurized here is fixed (fixed after being melted) to the recording material P. As a result, a four-color image is formed on the recording material P. The toner remaining on the surface of the intermediate transfer belt 15 after passing through the secondary transfer nip portion N2 is scraped off by a belt cleaner (not illustrated).

The recording material P having passed through the fixing device 8 is discharged to the outside of the body of the image forming apparatus S by the discharge roller 7, and is stacked on the ejected-sheet tray 5, which is an ejected-sheet stacking portion provided on the upper surface portion of the cover 4. The image forming operation of the image forming apparatus S has been described above.

The image forming apparatus S includes an operation panel 6. The operation panel 6 includes a touch panel type display (operation display portion) in which a display portion capable of displaying information based on image data and an operation portion that detects a user's touch operation are integrated. The user can perform settings related to image formation such as the number of sheets of recording material to be output and a size of the recording material to be output by touching a key displayed on the display with a finger as an input.

Next, the arrangement of the control board 31 and the wireless communication board 32 will be described with reference to FIGS. 4 to 10.

Figure 5:
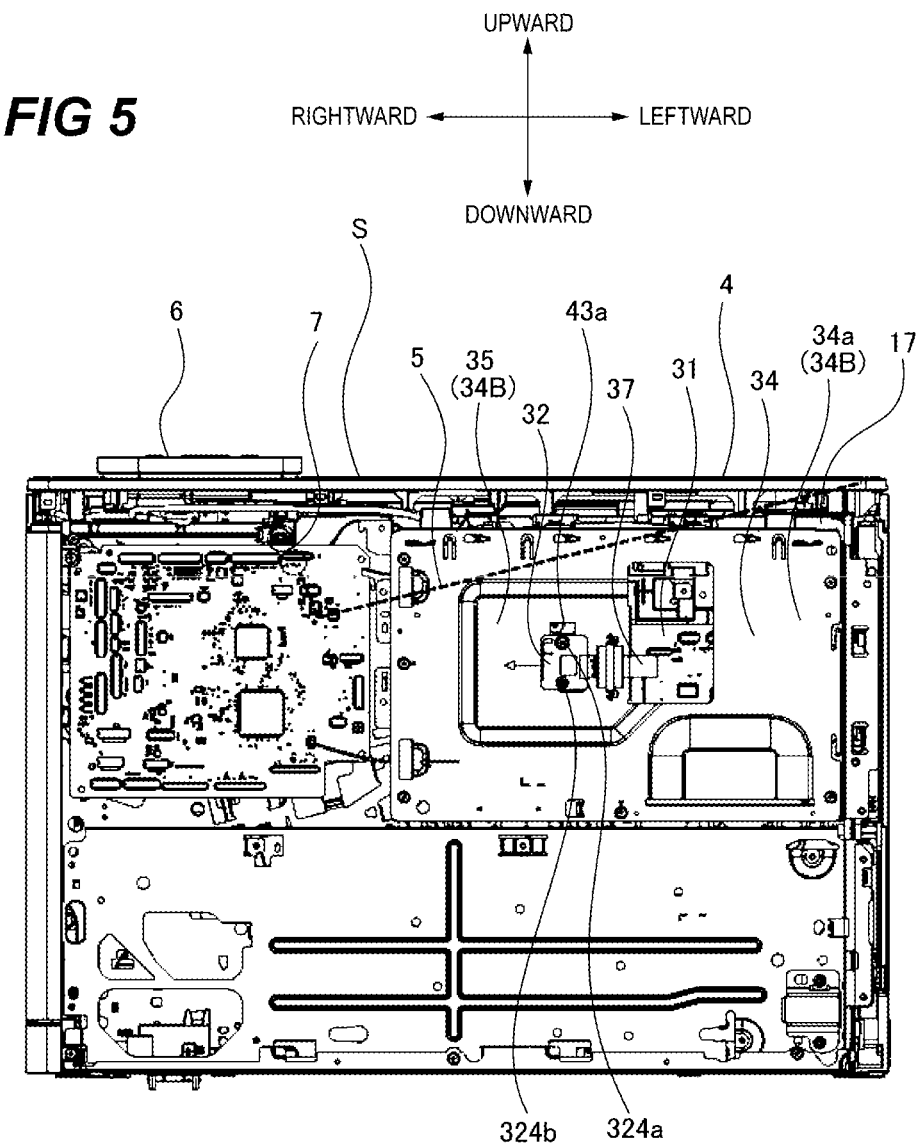
FIG. 5 is a schematic view illustrating the back side of the image forming apparatus.
Figure 6:
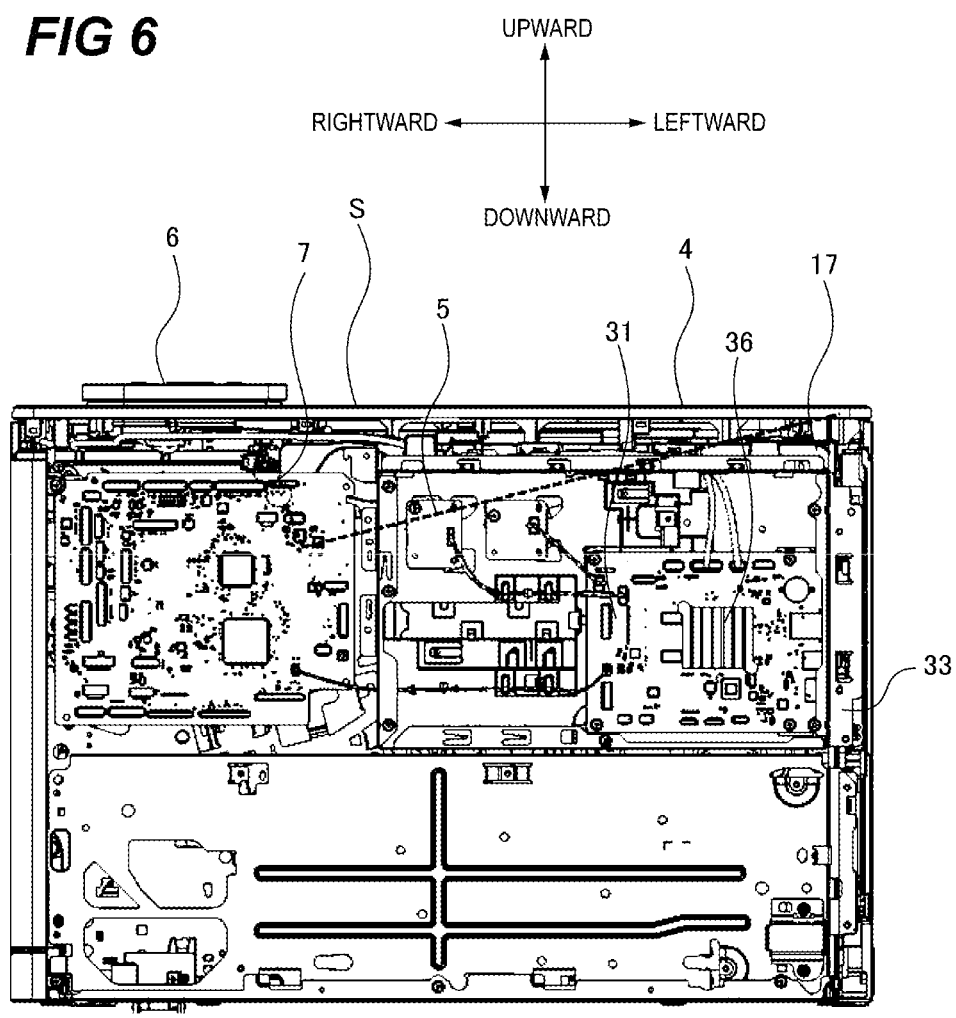
FIG. 6 is a rear view of the image forming apparatus in a state where a shield plate is removed therefrom.
Figure 7:
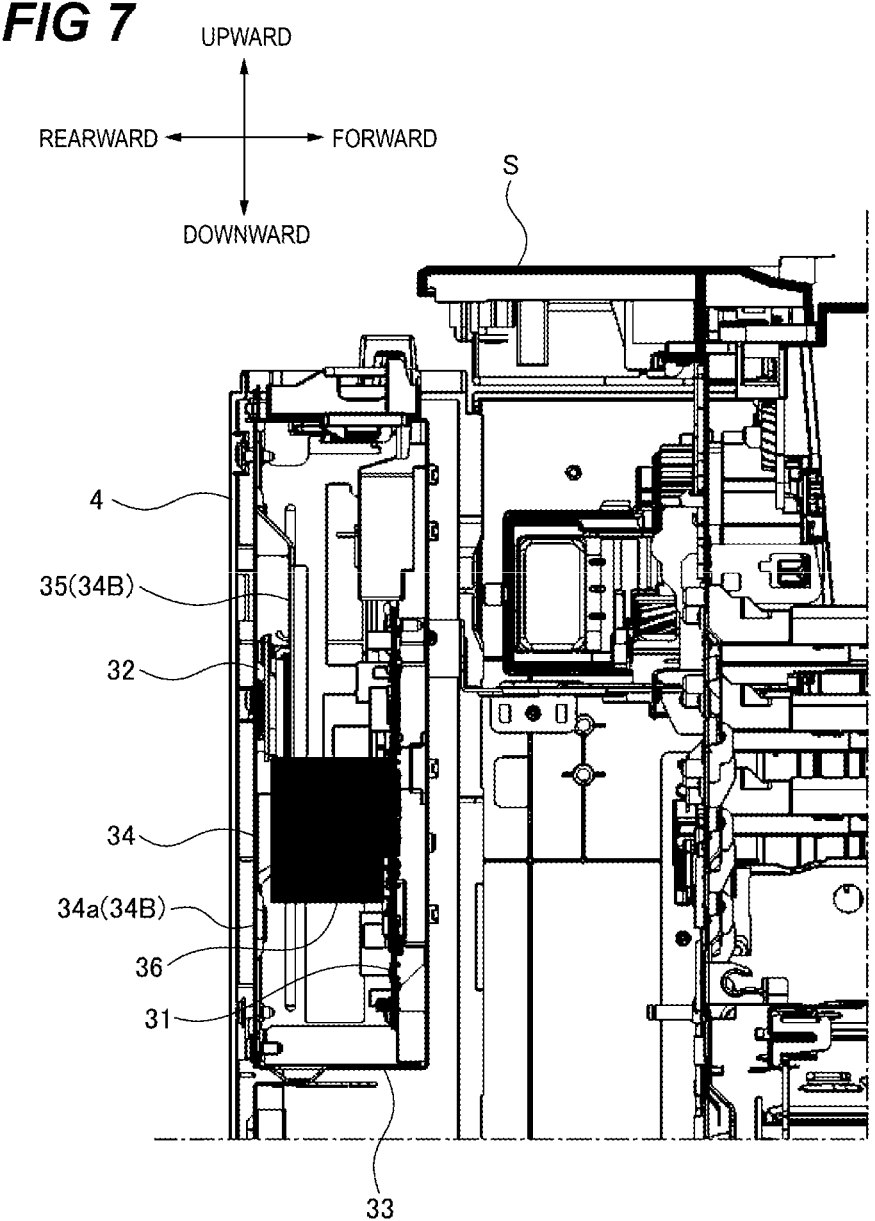
FIG. 7 is a side sectional view illustrating a periphery of a control board of the image forming apparatus.
Figure 8:
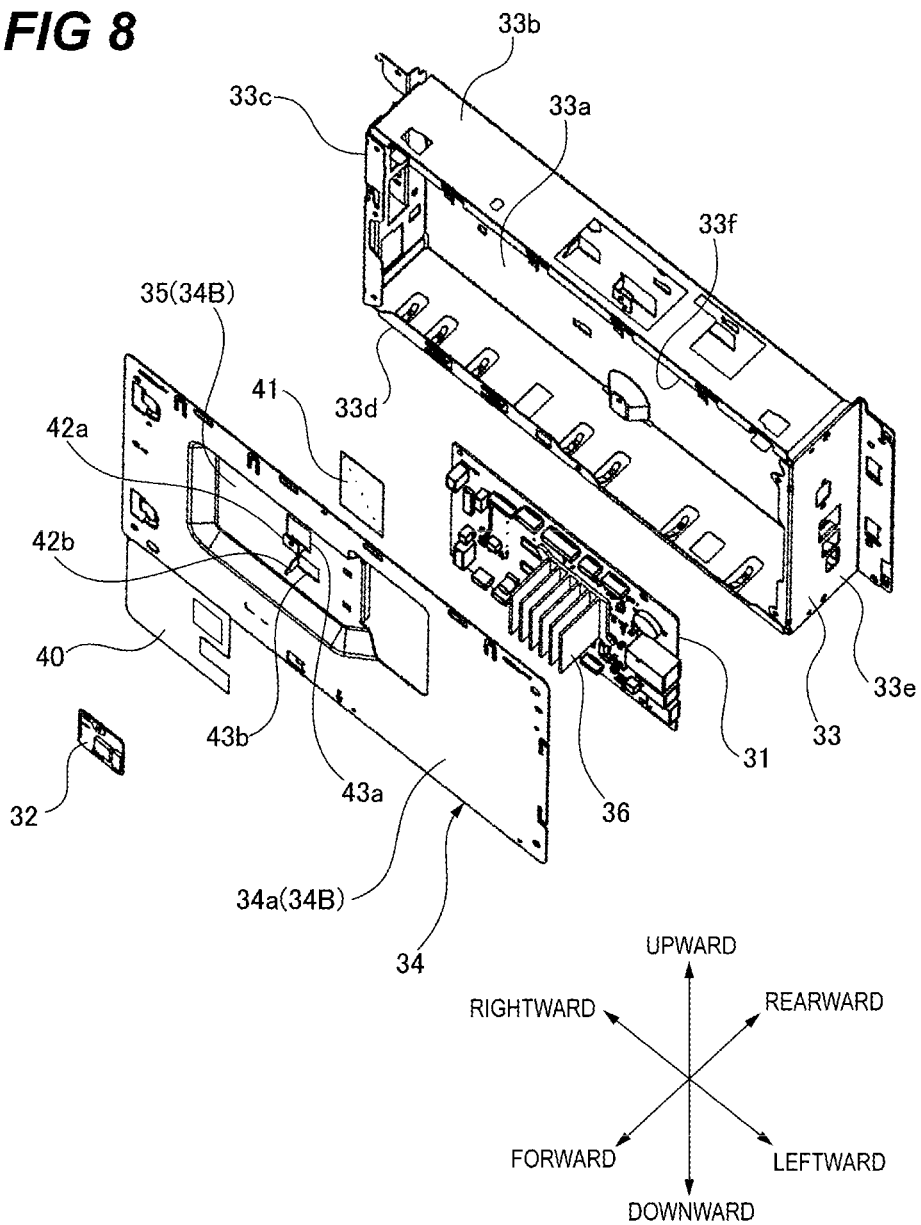
FIG. 8 is an exploded perspective view around the control board including a wireless communication board and a magnetic sheet.
Figure 9:
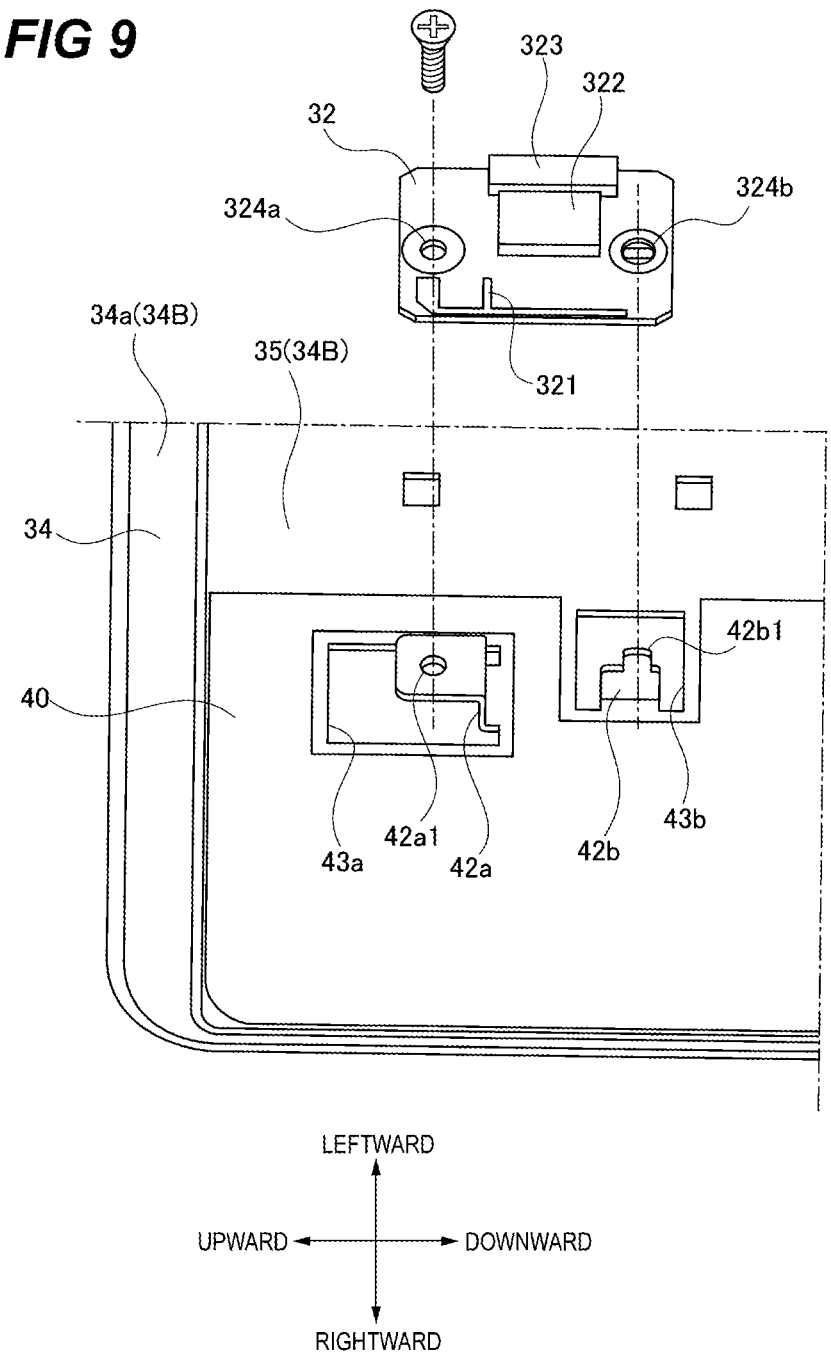
FIG. 9 is a perspective view illustrating attachment portions of the shield plate and the wireless communication board.
Figure 10:
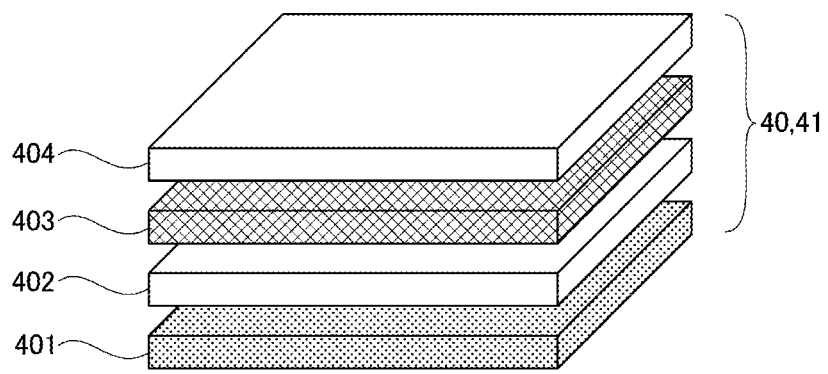
FIG. 10 is a diagram illustrating a configuration of the magnetic sheet.

FIG. 4 is a perspective view illustrating the back side of the image forming apparatus, and FIG. 5 is a schematic view illustrating the back side of the image forming apparatus. FIG. 6 is a rear view of the image forming apparatus in a state where a shield plate is removed therefrom. FIG. 7 is a side sectional view illustrating a periphery of a control board of the image forming apparatus. FIG. 8 is an exploded perspective view around the control board including a wireless communication board and a magnetic sheet. FIG. 9 is a perspective view illustrating attachment portions of the shield plate and the wireless communication board. FIG. 10 is a diagram illustrating a configuration of the magnetic sheet.

The image forming apparatus S includes a wireless communication board 32 that communicates image data with an external device in a wireless manner, a control board 31 connected to the wireless communication board 32 by a connection line, a support plate 33 as a first sheet metal, and a shield plate 34 as a second sheet metal.

The control board 31 is fixed to the support plate 33. A heat sink 36 for cooling a heat source such as a CPU (not illustrated) mounted on the control board 31 is attached to the control board 31. The control board 31 is electrically connected to the wireless communication board 32 by a flexible cable 37 which is a connection line.

The support plate 33 covers the control board 31 and forms an accommodation space for accommodating the control board 31. As illustrated in FIG. 8, the support plate 33 has a fixing surface 33a for fixing the control board 31, and side walls 33b to 33e formed to surround the periphery of the fixing surface 33a. The support plate 33 has an opening 33f on a side facing the fixing surface 33a in a thickness direction of the control board 31. The opening 33f of the support plate 33 is formed by edges of the side walls 33b to 33e surrounding the periphery of the fixing surface 33a.

In other words, the support plate 33 is formed of a sheet metal formed to surround the periphery of the control board 31, and a surface of the support plate 33 in at least one direction is an open surface (opening 3M) released so that the control board 31 can be accessed during assembly and maintenance.

Here, since the support plate 33 is attached to the rear plate 17 constituting the frame of the image forming apparatus, the thickness direction of the control board 31 is a direction that coincides with the front-rear direction of the image forming apparatus.

The support plate 33 is fixed to a rear surface side of the rear plate 17 disposed on the rear side of the image forming apparatus S. The control board 31 is attached to the support plate 33 through the open surface side to be attached to the image forming apparatus S.

As illustrated in FIG. 6, the control board 31 is disposed in the image forming apparatus S to be lower than the ejected-sheet tray 5 in the up-down direction of the image forming apparatus S and downstream of the discharge roller 7 in the conveyance direction of the recording material P.

The shield plate 34 is attached to the support plate 33 to cover the opening 33f of the support plate 33. Together with the support plate 33, the shield plate 34 covers the control board 31, and forms an accommodation space for accommodating the control board 31. The support plate 33 and the shield plate 34 function as an accommodation portion that accommodates the control board 31. The shield plate 34 is a predetermined metal plate of the accommodation portion. Similarly to the support plate 33, the shield plate 34 is also formed of a sheet metal, and is detachably attachable to the support plate 33.

Here, the surface of the shield plate 34 facing the control board 31 is a front surface in the front-rear direction of the image forming apparatus S, and the opposite surface is a rear surface in the front-rear direction of the image forming apparatus S.

The rear surface 34B on the opposite side of the front surface of the shield plate 34 facing the control board 31 includes a first surface 34a, and a second surface 35 closer to the control board than the first surface 34a in the thickness direction of the control board 31.

The second surface 35 of the shield plate 34 is a surface to which the wireless communication board 32 is attached, and is a recessed surface (recessed portion) closer to the control board in the thickness direction (front-rear direction) of the control board 31 than the first surface 34a other than the surface to which the wireless communication board 32 is attached. The wireless communication board 32 is positioned on the second surface 35 as a recessed portion.

As illustrated in FIG. 8, the second surface (recessed surface) 35 of the shield plate 34 is provided at a different position from the heat sink 36 attached to the control board 31 in a planar direction of the control board 31. When viewed from a direction perpendicular to the shield plate 34, the position of the second surface (recessed surface) 35 does not overlap with a position of a component (e.g., the heat sink) having a relatively large height among the plurality of components mounted on the control board 31. In other words, the second surface (recessed surface) 35 of the shield plate is provided in a portion avoiding a component (e.g., the heat sink) having a large size in the thickness direction of the control board 31 among the components mounted on the control board 31. As a result, as illustrated in FIG. 7, it is possible to suppress the height of the shield plate to a height of a component (e.g., the heat sink 36) having a large size in the thickness direction of the control board, and accordingly, it is possible to suppress an increase in size of the image forming apparatus.

The shield plate 34 has attachment portions 42a and 42b formed by cutting and raising the shield plate 34 for attaching the wireless communication board 32 thereto. As illustrated in FIG. 9, the attachment portions of the shield plate 34 according to the present embodiment includes a first attachment portion 42a and a second attachment portion 42b. The first attachment portion 42a and the second attachment portion 42b are provided on the second surface 35 of the shield plate 34.

The first attachment portion 42a is formed by cutting and raising the shield plate 34, and has a seating surface 42a1 to which an attachment hole 324a that is a first hole provided in the wireless communication board 32 is fixed by screwing.

The second attachment portion 42b is formed by cutting and raising the shield plate 34, and has a protrusion 42b1 penetrating through a positioning hole 324b that is a second hole of the wireless communication board 32 to position the wireless communication board 32 on the shield plate 34. The second attachment portion 42b is formed by cutting and raising a different portion of the shield plate 34 from the first attachment portion 42a. The protrusion 42b1 of the second attachment portion 42b penetrates through the positioning hole 324b that is a second hole provided at a different position from the attachment hole 324a that is a first hole of the wireless communication board 32 to position the wireless communication board 32 on the shield plate 34.

Since the attachment portions 42a and 42b are formed by cutting and raising the shield plate 34, holes 43a and 43b are formed in the shield plate 34 at that time. That is, the shield plate 34 has holes 43a and 43b.

The wireless communication board 32 is attached onto the rear surface 34B opposite to the front surface of the shield plate 34 facing the control board 31. That is, the wireless communication board 32 is attached onto a surface of the shield plate 34 on the rear side of the image forming apparatus S. A recessed surface (second surface 35) closer to the control board 31 than the first surface 34a is provided on the rear surface 34B of the shield plate 34 that is a surface onto which the wireless communication board is attached. As described above, the second surface 35 which is a recessed surface of the shield plate 34 is provided in a portion avoiding a large component, e.g., the heat sink or the like, among the component mounted on the control board 31. The wireless communication board 32 is attached onto the second surface (recessed surface) 35 of the shield plate 34. That is, the wireless communication board 32 is attached onto the second surface (recessed surface) 35 of the rear surface 34B opposite to the surface of the shield plate 34 facing the control board 31.

The wireless communication board 32 is electrically connected to the control board 31 by the flexible cable 37.

Here, the configuration of the wireless communication board 32 will be described with reference to FIG. 9.

The wireless communication board 32 is, for example, a board in which a metal pattern is formed of a plurality of copper foil layers on a base material obtained by impregnating a glass cloth with an epoxy resin, and electronic components are mounted by soldering. However, the base material may be manufactured using materials other than the materials described above, and the components to be mounted are not limited.

In the present embodiment, the wireless communication board 32 includes a wireless communication antenna 321, a wireless communication driver circuit 322, a communication connector 323, an attachment hole 324a, and a positioning hole 324b.

The wireless communication antenna 321 is a pattern antenna formed of a metal pattern on a surface of the wireless communication board 32, and is used for transmitting and receiving wireless radio waves.

The wireless communication driver circuit 322 functions as a communication circuit that communicates image data with an external device in a wireless manner. The wireless communication driver circuit 322 outputs an electric signal to the wireless communication antenna 321 or processes an electric signal received by the wireless communication antenna 321. Further, the wireless communication driver circuit 322 converts data for performing network communication between the control board 31 and the external device. When data is transmitted from the control board 31 to the external device, data generated by the control board 31 to be transmitted is converted into a signal format conforming to a wireless communication standard and output to the wireless communication antenna 321 as an electric signal. When data is received from the external device to the control board 31, an electric signal received by the wireless communication antenna 321 is decoded into communication data by a method conforming to a wireless communication standard, and is transmitted to the control board 31. The wireless communication driver circuit 322 includes components and the like mounted on a front surface and a back surface of the wireless communication board 32, but the surfaces on which the components are mounted are not limited. Also, the metal patterns for connecting the components to each other may be formed anywhere on the front surface, the back surface, and the inner layer of the wireless communication board 32.

The communication connector 323 is an OF connector used for wired connection to communicate data transmitted and received by the wireless communication board 32 with a network controller (not illustrated) and the wireless communication driver circuit 322. The communication connector 323 is mounted on the same surface as the wireless communication antenna 321.

The attachment hole 324a and the positioning hole 324b are used when the wireless communication board 32 is attached to the shield plate 34. The attachment hole 324a is used to define a position of a screw when the wireless communication board 32 is attached to the shield plate 34 by screwing. Note that the attachment hole has a closed shape in the present embodiment, but may have a partially opened shape such as a notch. The positioning hole 324b is used to position the wireless communication board 32 with respect to the shield plate 34. The position of the wireless communication board 32 is determined with respect to the shield plate 34 before screwing by passing the protrusion 42b1 of the second attachment portion 42b through the positioning hole 324b of the wireless communication board 32.

Note that a copper foil exposed portion (not illustrated) electrically connected to (contacting) the seating surface 42a1 of the first attachment portion 42a is provided around the attachment hole 324a on the surface of the wireless communication board 32 facing the shield plate 34. A GND potential of the wireless communication board 32 including the wireless communication driver circuit 322 is electrically conducted with that of the copper foil exposed portion. Note that the copper foil exposed portion may be subjected to a surface treatment such as gold plating so as to be hardly oxidized while having conductivity.

Here, the radio wave propagation characteristic of the wireless communication board 32 is affected by the stability of the GND potential serving as a reference potential of the wireless communication board 32, and the radio wave propagation characteristic deteriorates when the GND potential is unstable. As an example of a method for stabilizing the GND potential of the wireless communication board 32, the GND potential of the wireless communication board 32 is electrically conducted with that of the frame that is a metal housing to be a GND potential of the image forming apparatus S. First, the attachment portion 42a for attaching the wireless communication board 32 to the image forming apparatus S is electrically conducted with the frame of the image forming apparatus S. Next, the wireless communication board 32 is screwed to the attachment portion 42a of the image forming apparatus S through the attachment hole 324a so that the attachment portion 42a of the image forming apparatus S and the copper foil exposed portion are in contact with each other. Since the attachment portion 42a of the image forming apparatus S and the copper foil exposed portion of the wireless communication board 32 are pressed against each other by the screwing pressure, the GND potential of the wireless communication board 32 is electrically conducted with the GND potential of the image forming apparatus S.

Note that, although the conduction of the GND potential is secured by bringing the copper foil exposed portion of the wireless communication board 32 and the metal of the attachment portion of the image forming apparatus S into contact with each other in a state where pressure is applied thereto through screwing in the present embodiment, the method for securing the conduction of the GND potential is not limited thereto. For example, the conduction of the GND potential may be secured by providing a conductive spring, conductive grease, or the like on metal between the copper foil exposed portion and the attachment portion of the image forming apparatus, such that the copper foil exposed portion and the attachment portion of the image forming apparatus may be attached to each other without applying pressure through screwing or the like. Further, when the radio wave propagation characteristic of the wireless communication antenna 321 is sufficiently good, the attachment hole 324a and the copper foil exposed portion may not be formed in the wireless communication board 32. Alternatively, when the wireless communication board 32 having the attachment hole 324a and the copper foil exposed portion is assembled to the image forming apparatus S, the copper foil exposed portion may not be electrically conducted with the frame of the image forming apparatus. In the present embodiment, the attachment hole 324a and the copper foil exposed portion are not limited to be included in the configuration of the wireless communication board 32.

The image forming apparatus S further includes magnetic sheets 40 and 41 each including a magnetic layer containing at least metal powder. The magnetic sheets 40 and 41 are disposed between the wireless communication board 32 and the control board 31, and are attached to the shield plate 34 to cover the wireless communication board 32.

Here, first, a structure of each of the magnetic sheets 40 and 41 will be described with reference to FIG. 10. FIG. 10 is a diagram illustrating a structure of each of the magnetic sheets 40 and 41. The magnetic sheets 40 and 41 have the same structure.

Each of the magnetic sheets 40 and 41 includes a surface film 401, a magnetic layer 402, a double-sided adhesive tape 403, and a release liner 404. The surface film 401 is a protective layer serving to protect the magnetic layer 402, and is an insulator. The magnetic layer 402 is a conductor mainly made of metal powder and resin, and has a different principle of radio wave absorption depending on the type of material used, and is classified as one of three types, i.e. dielectric loss, magnetic loss, and reflective loss. The double-sided adhesive tape 403 is an adhesive layer serving to fix each of the magnetic sheets 40 and 41 to a place where the magnetic sheet adheres, and is an insulator. The release liner 404 serves to protect the double-sided adhesive tape 403, and is peeled off when each of the magnetic sheets 40 and 41 is used.

In addition, the arrangement of the magnetic sheets 40 and 41 will be described with reference to FIG. 8.

Each of the magnetic sheets 40 and 41 includes a magnetic layer 402 (see FIG. containing at least metal powder. As a result, each of the magnetic sheets 40 and 41 can convert an electromagnetic wave such as electrical noise generated from the board into heat.

The magnetic sheet 40 is disposed between the wireless communication board 32 and the shield plate 34, and is attached to a surface (outer surface) of the shield plate 34 facing the wireless communication board.

The magnetic sheet 40 is attached to the shield plate 34 to cover an area larger than the area of the wireless communication board 32.

At this time, the magnetic sheet 40 is attached to the shield plate 34 to cover at least a region of the wireless communication antenna 321 of the wireless communication board 32.

Furthermore, in the present embodiment, the magnetic sheet 40 is attached to the shield plate 34 to cover a region excluding the holes 43a and 43b formed in the shield plate 34 so that the attachment portions 42a and 42b are formed (see FIG. 9).

The magnetic sheet 41 is disposed between the control board 31 and the shield plate 34, and is attached to a surface (inner surface) of the shield plate 34 facing the control board.

The magnetic sheet 41 is attached to the shield plate 34 to cover the holes 43a and 43b formed in the shield plate 34 so that the attachment portions 42a and 42b are formed.

By arranging the magnetic sheets 40 and 41 in this manner, when the wireless communication board 32 is attached to the shield plate 34, it is possible to prevent the radio wave of the wireless communication board 32 from being weakened, to reduce the emission of electric noise from the control board 31 to the outside of the apparatus, and to reduce the influence of noise input from the outside of the apparatus to the control board.

As described above, according to the present embodiment, the wireless communication board 32 is attached to the rear surface 34B of the shield plate 34 opposite to the surface facing the control board 31, and is attached to the second surface (recessed surface) 35 closer to the control board 31 than the first surface 34a of the rear surface 34B. As a result, it is possible to improve the communication function of the wireless communication board 32 while suppressing an increase in size of the accommodation space formed by the support plate 33 and the shield plate 34 in the thickness direction of the control board 31. In addition, when the wireless communication board 32 is attached as described above, it is possible to prevent the radio wave of the wireless communication board 32 from being weakened, to reduce the emission of electric noise from the control board 31 to the outside of the apparatus, and to reduce the influence of noise input from the outside of the apparatus to the control board.

Note that, although the configuration in which the magnetic sheet 40 disposed between the wireless communication board 32 and the control board 31 is attached to the shield plate 34 to cover the wireless communication board 32 has been exemplified in the above-described embodiment, the attachment of the magnetic sheet is not limited thereto. For example, the magnetic sheet 40 disposed between the wireless communication board 32 and the control board 31 may be attached to a surface of the wireless communication board 32 (a surface facing the shield plate) opposite to a surface on which the wireless communication antenna 321 is provided. In this case, the magnetic sheet 40 can be attached to cover at least a region of the wireless communication antenna 321 of the wireless communication board 32. The magnetic sheet 40 disposed between the wireless communication board 32 and the control board 31 may be attached to one or both of the shield plate 34 and the wireless communication board 32.

In addition, although the scanning exposure type exposure unit (laser scanner portion) that performs scanning exposure by driving the rotary polygon mirror to rotate is used as an exposing portion in the above-described embodiment, the exposing portion is not limited thereto. For example, an exposure head in which light emitting elements such as LEDs and or organic EL elements are arranged in a substantially linear shape in a direction (main scanning direction) parallel to the rotation axis of the photosensitive drum may be used as an exposing portion.

In addition, although the printer has been exemplified as an image forming apparatus in the above-described embodiment, but the image forming apparatus is not limited thereto. For example, another image forming apparatus such as a copying machine or a facsimile machine, or another image forming apparatus such as a multifunction peripheral combining the functions of the copying machine and the facsimile machine may be used. In addition, although the image forming apparatus has been exemplified in which an intermediate transfer member is used, such that toner images of respective colors are transferred onto the intermediate transfer member in a sequentially superimposed manner, and the toner images carried on the intermediate transfer member are collectively transferred to the recording material, the image forming apparatus is not limited thereto. The image forming apparatus may be an image forming apparatus in which a recording material carrier is used to transfer toner images of respective colors on a recording material carried by the recording material carrier in a sequentially superimposed manner. By applying the present invention to these image forming apparatuses, similar effects can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-107812, filed Jul. 4, 2022, which is hereby incorporated by reference herein in its entirety.

What is claimed is:

1. An image forming apparatus comprising:
    a wireless communication board including a communication circuit configured to communicate image data with an external device wirelessly;
    an image forming unit configured to form an image based on the image data;
    a control board connected to the wireless communication board via a connection line, and configured to control an image forming operation of the image forming unit;
    a metal accommodation portion accommodating the control board and including a predetermined metal plate with a recessed portion, wherein:
        the predetermined metal plate includes an attachment portion formed by cutting and raising the predetermined metal plate to attach the wireless communication board; and
        the wireless communication board is disposed in the recessed portion of the predetermined metal plate; and
    a sheet attached to the predetermined metal plate to cover a hole formed in the predetermined metal plate to form the attachment portion.

2. The image forming apparatus according to claim 1, wherein the sheet is attached onto a surface of the predetermined metal plate facing the control board.

3. The image forming apparatus according to claim 1, wherein the sheet includes a magnetic layer containing metal powder.

4. The image forming apparatus according to claim 3, wherein the sheet includes a protective layer configured to protect the magnetic layer, and an adhesive layer configured to attach the sheet to the predetermined metal plate, in addition to the magnetic layer.

5. The image forming apparatus according to claim 1, further comprising another sheet between the predetermined metal plate and the wireless communication board.

6. The image forming apparatus according to claim 5, wherein the another sheet includes a magnetic layer containing metal powder.

7. The image forming apparatus according to claim 5, wherein the another sheet is attached to the predetermined metal plate to cover an antenna region of the wireless communication board.

* * * * *